United States Patent
Guo et al.

(10) Patent No.: US 11,924,893 B2
(45) Date of Patent: Mar. 5, 2024

(54) METHOD FOR ESTABLISHING CONNECTION, AND TERMINAL DEVICE

(71) Applicant: GUANGDONG OPPO MOBILE TELECOMMUNICATIONS CORP., LTD., Dongguan (CN)

(72) Inventors: Yali Guo, Dongguan (CN); Fei Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/242,735

(22) Filed: Sep. 6, 2023

(65) Prior Publication Data

US 2023/0413350 A1 Dec. 21, 2023

Related U.S. Application Data

(63) Continuation of application No. PCT/CN2021/091970, filed on May 6, 2021.

(51) Int. Cl.
*H04W 76/10* (2018.01)
*H04W 28/24* (2009.01)

(52) U.S. Cl.
CPC ........... *H04W 76/10* (2018.02); *H04W 28/24* (2013.01)

(58) Field of Classification Search
CPC .. H04W 76/10; H04W 28/0268; H04W 28/24
See application file for complete search history.

(56) References Cited

U.S. PATENT DOCUMENTS

| | | | |
|---|---|---|---|
| 2018/0176927 A1 | 6/2018 | Deng | |
| 2019/0281491 A1 | 9/2019 | Cheng | |
| 2023/0077779 A1* | 3/2023 | Basu Mallick | H04L 1/1825 370/329 |
| 2023/0188964 A1* | 6/2023 | Pateromichelakis | H04L 67/34 709/218 |
| 2023/0199877 A1* | 6/2023 | Chang | H04W 76/14 370/329 |
| 2023/0209370 A1* | 6/2023 | Pateromichelakis | G06N 20/00 370/328 |

(Continued)

FOREIGN PATENT DOCUMENTS

CN 112584545 A 3/2021

OTHER PUBLICATIONS

Oppo et al. "TS 23.304: QoS handling for Layer-3 UE-to-Network Relay without N3IWF" SA WG2 Meeting #144-E S2-2103510, Apr. 16, 2021 (Apr. 16, 2021), entire document, 2 pages.

(Continued)

*Primary Examiner* — Syed Ali
(74) *Attorney, Agent, or Firm* — BAYES PLLC (57) ABSTRACT

A for establishing a connection includes that: a relay terminal establishes a protocol data unit (PDU) session with a network device, the PDU session being used for relaying data of a remote terminal which has established a communication connection with the relay terminal; the relay terminal processes the PDU session based on service description information; and the relay terminal sends information of the remote terminal to the network device according to the processed PDU session. A terminal device is also provided.

11 Claims, 5 Drawing Sheets

(56) References Cited

U.S. PATENT DOCUMENTS

| | | | | |
|---|---|---|---|---|
| 2023/0246724 A1* | 8/2023 | Pateromichelakis | ......................... | H04W 72/0453 370/329 |
| 2023/0269799 A1* | 8/2023 | Cai | ...................... | H04W 72/40 370/329 |
| 2023/0309155 A1* | 9/2023 | Zhang | .................. | H04W 24/10 370/329 |
| 2023/0319946 A1* | 10/2023 | Wang | .................... | H04W 76/27 370/329 |

OTHER PUBLICATIONS

International Search Report in the international application No. PCT/CN2021/091970, dated Jan. 26, 2022, 5 pages with English translation.

English translation of the Written Opinion of the International Search Authority in the international application No. PCT/CN2021/091970, dated Jan. 26, 2022, 6 pages with English translation.

"3rd Generation Partnership Project; Technical Specification Group Services and System Aspects; Study on system enhancement for Proximity based Services (ProSe) in the 5G System (5GS) (Release 17)", 3GPP TR 23.752, V1.0.0 (Nov. 2020), cited in p. 35-39 "Solution #6: Layer-3 UE-to-Network Relay", 182 pages.

Huawei, HiSilicon, "KI#3, Sol#24, 25: Additional considerations for QoS handling in Layer 3 UE-to-Network Relay", 3GPP TSG-WG SA2 Meeting #140E e-meeting S2-2006567, Aug. 19-Sep. 1, 2020, 5pages.

\* cited by examiner

METHOD FOR ESTABLISHING CONNECTION, AND TERMINAL DEVICE

CROSS-REFERENCE TO RELATED APPLICATION

This application is a continuation application of International Application No. PCT/CN2021/091970, entitled "METHOD FOR ESTABLISHING CONNECTION, AND TERMINAL DEVICE", filed on May 6, 2021, the disclosure of which is hereby incorporated by reference in its entirety.

TECHNICAL FIELD

The present disclosure relates to the field of communications, and in particular to a method for establishing a connection and a terminal device.

BACKGROUND

A terminal device with a Proximity-based Services (Prose) capability can communicate directly with another terminal with the Prose capability through a specified interface. When a terminal is capable of connecting to a data network and has the Prose capability, this terminal can be used as a relay terminal (relay user equipment (UE)), and another terminal with the Prose capability can be used as a remote terminal (a remote UE). The remote UE can establish a direct connection with the relay UE and interact with an external network through a Protocol Data Unit (PDU) session established between the relay UE and the network. Generally, each PDU session includes multiple Quality of Service (QoS) flows, which can carry out different QoS control on service data. UE can map service data to different QoS flows for transmission through QoS rule. However, one of the existing problems is that the relay UE may not be able to map the data of the remote UE to a correct QoS Flow, so it is necessary to optimize the process of the remote UE accessing the network.

SUMMARY

In view of this, the embodiments of the present disclosure provide a method for establishing a connection and a terminal device, which can optimize the process of a remote terminal accessing a network.

An embodiment of the present disclosure provides a method for establishing a connection, which includes that:
establishing, by a relay terminal, a protocol data unit (PDU) session with a network device, the PDU session being used for relaying data of a remote terminal which has established a communication connection with the relay terminal;
processing, by the relay terminal, the PDU session based on service description information; and
sending, by the relay terminal, information of the remote terminal to the network device according to the PDU session as processed.

An embodiment of the present disclosure also provides a terminal device, which includes:
a processor; and
a memory for storing a computer program executable by the processor,
where the processor is configured to execute the computer program to:
establish a PDU session with a network device, the PDU session being used for relaying data of a remote terminal which has established a communication connection with the terminal device;
process the PDU session based on service description information; and
send information of the remote terminal to the network device according to the PDU session as processed.

An embodiment of the present disclosure also provides a terminal device, which includes:
a processor; and
a memory for storing a computer program executable by the processor,
wherein the processor is configured to execute the computer program to establish a communication connection with a relay terminal to trigger the relay terminal to establish a PDU session with a network device, process the PDU session based on service description information, and send information of a remote terminal to the network device according to the PDU session as processed.

DETAILED DESCRIPTION

The technical solutions in the embodiments of the present disclosure will be described below with reference to the accompanying drawings in the embodiments of the present disclosure.

The technical solutions of the embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A) system, a New Radio (NR) system, an evolution system of NR system, a LTE-based access to unlicensed spectrum (LTE-U) system, a NR-based access to unlicensed spectrum (NR-U) system, a Non-Terrestrial Networks (NTN) system, an Universal Mobile Telecommunications System (UMTS), Wireless Local Area Networks (WLAN), Wireless Fidelity (WiFi), 5th-Generation (5G) system or other communication systems, etc.

Generally speaking, conventional communication systems support a limited number of connections and are easy to implement. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. The embodiments of the present disclosure can also be applied to these communication systems.

In the embodiments of the present disclosure, the communication system can be applied to a Carrier Aggregation (CA) scenario, can be applied to a Dual Connectivity (DC) scenario, and can also be applied to a Standalone (SA) networking scenario.

The embodiments of the present disclosure describe various embodiments in conjunction with a network device and a terminal device. The terminal device may also be referred to as User Equipment (UE), an access terminal, a user unit, a user station, a mobile station, a remote station, a remote terminal, a mobile device, a user terminal, a terminal, a wireless communication device, a user agent or a user apparatus, etc.

In the embodiments of the present disclosure, the terminal device may be a STATION (ST) in a WLAN, may be a cellular telephone, a cordless telephone, a Session Initiation Protocol (SIP) telephone, a Wireless Local Loop (WLL) station, a Personal Digital Assistant (PDA) device, a handheld device with a wireless communication function, a computing device or other processing device connected to a wireless modem, a vehicle-mounted device, a wearable device, a terminal device in a next generation communication system such as an NR network, or a terminal device in a future evolved Public Land Mobile Network (PLMN) network, etc.

In the embodiments of the present disclosure, the terminal device may be deployed on land including indoors or outdoors, hand-held, wearable, or vehicle-mounted; it can also be deployed on the water (such as ships, etc.); or it can also be deployed in the air (such as on airplanes, balloons and satellites, etc.).

In the embodiments of the present disclosure, the terminal device may be a Mobile Phone, a tablet (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

In an embodiment of the present disclosure, the terminal device may also be a wearable device. Wearable device may also be referred to as a wearable smart device, which is the general name of devices which are wearable and developed by applying wearable technology to intelligently design daily wear, such as glasses, gloves, watches, clothing and shoes. Wearable device is a portable device that is worn directly on the body or integrated into the user's clothes or accessories. Wearable device not only is a kind of hardware device, but also realizes powerful functions through software support, data interaction and cloud interaction. Generalized wearable smart devices include devices that has full functions, are large in size, and can realize complete or partial functions without relying on smart phones, for example: smart watches or smart glasses, etc.; and include devices that only focus on certain application functions, which need to be used in conjunction with other devices such as smart phones, such as various smart bracelets and smart jewelry for monitoring physical signs.

In the embodiments of the present disclosure, the network device may be a device used for communicating with a mobile device. The network device may be an Access Point (AP) in a WLAN, a Base Transceiver Station (BTS) in a GSM or CDMA, a base station (NodeB, NB) in a WCDMA, an Evolutional Node B (eNB or eNodeB) in a LTE, or a relay station or an Access Point, or a vehicle-mounted device, a wearable device, a network device in an NR network (gNB), or a network device in a future evolved PLMN network, etc.

In the embodiments of the present disclosure, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, and the like. Optionally, the network device may also be a base station installed on land, water and other locations.

In the embodiments of the present disclosure, the network device may provide services for a cell, and the terminal device communicates with the network device through the transmission resources (e.g., frequency domain resources, or spectrum resources) used by the cell. The cell may be a cell corresponding to the network device (e.g., a base station), and the cell may belong to a macro base station or a base station corresponding to a Small cell. The Small cell herein may include: a Metro cell, a Micro cell, a Pico cell, a Femto cell, etc. These Small cells have the characteristics of small coverage and low transmission power, and are suitable for providing high-speed data transmission services.

Figure 1:
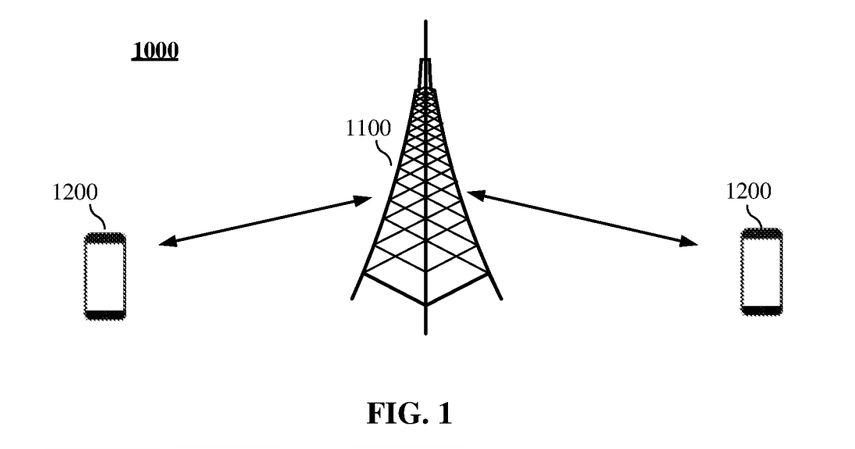
FIG. 1 is a schematic diagram of a communication system architecture according to an embodiment of the present disclosure.

FIG. 1 schematically illustrates a network device 1100 and two terminal devices 1200. Optionally, the wireless communication system 1000 may include multiple network devices 1100, and the coverage of each network device 1100 may include other numbers of terminal devices, which is not limited in embodiments of the present disclosure. Optionally, the wireless communication system 1000 illustrated in FIG. 1 may also include other network entities such as a Mobility Management Entity (MME), an Access and Mobility Management Function (AMF), etc., which is not limited in the embodiments of the present disclosure.

It should be understood that the terms "system" and "network" herein are often used interchangeably herein. The term "and/or" herein is used to describe an association between related objects, for example, to represent that there may be three relationships between objects related back and forth. For example, A and/or B may represent that: there are three situations of A alone, A and B simultaneously, and B alone. Herein, the character "/" generally represents that the relationship between the objects related back and forth is "or". In the description of the embodiments of the present disclosure, the term "correspond" may represent that there is a direct correspondence or an indirect correspondence between the two, may also represent that there is an association between the two, which may also be a relationship of indicating and being indicated, configuring and being configured, etc.

In order to clearly explain the idea of the embodiments of the present disclosure, first of all, the processing process in the communication system is briefly descried.

Figure 2:
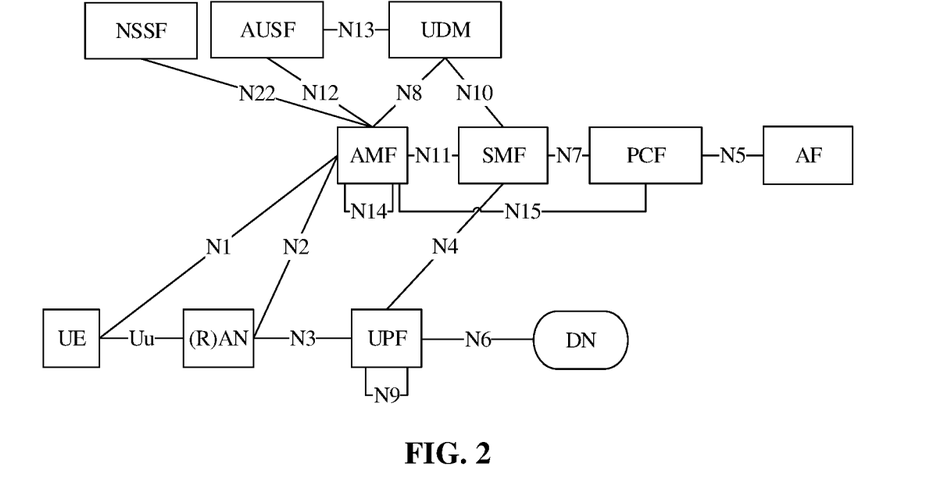
FIG. 2 is an architectural schematic diagram of a 5G network system according to an embodiment of the present disclosure.

FIG. 2 illustrates a 5G network system architecture, in which a UE carries out an access layer connection, access layer message interaction and wireless data transmission with an Access Network (AN) through a Uu wireless interface. UE carries out an Non-Access Stratum (NAS) connection with AMF through N1 interface and interacts NAS messages. AMF is a mobility management function in the core network, and SMF is a Session Management Function in the core network. AMF is responsible for forwarding session management related messages between UE and SMF in addition to mobility management of UE. PCF is a Policy Control Function in the core network, which is responsible for formulating mobility management, session management, billing and other related policies for UE. UPF is a User Plane Function in the core network, which transmits data with an external data network through N6 interface and transmits data with AN through N3 interface.

After UE accesses 5G network through the Uu interface, PDU session is established under the control of SMF for data transmission. Each PDU session includes multiple QoS flows for carrying out different QoS control on service data. UE maps service data to different QoS flows for transmission through QoS rule. The main content of QoS rule includes a service descriptor and QoS flow identifier. The service descriptor may also be referred to as a packet filter. For IP type data, for example, the service descriptor may be IP quintuple information, that is, a source address, a source port number, a destination address, a destination port number and a protocol type.

Figure 3:
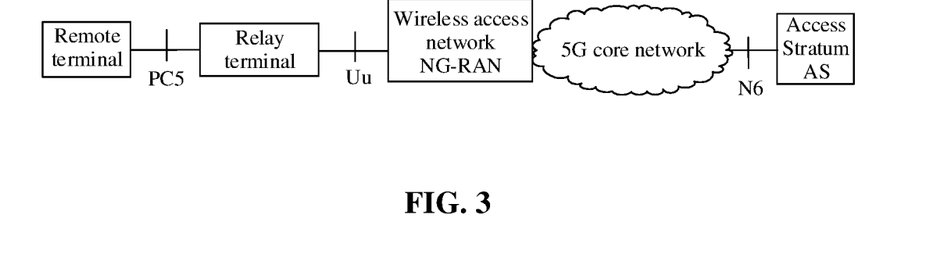
FIG. 3 is an architectural schematic diagram for accessing a network through a relay terminal according to an embodiment of the present disclosure.

FIG. 3 illustrates a schematic diagram of a system architecture for accessing a network through a relay terminal. A UE with proximity-based services (Prose) capability may communicate directly with another UE with Prose capability through a PC5 interface. When a UE may be connected to an external data network through a 5G network and has Prose capability, this UE may be used as a relay UE, and another UE with Prose capability may be used as a remote UE. The remote UE may establish a direct connection with the relay UE through a PC5 interface and interact with the external network through a PDU session established by the relay UE with the 5G network.

However, since after the remote UE establishes a connection with the relay UE through the PC5 interface, the remote UE does not send the service description information to the relay UE through the PC5 interface, so the relay UE cannot generate the corresponding QoS rule used for the PDU session between the relay UE and the network for the data from the remote UE, resulting in the relay UE cannot map the data of the remote UE to the correct QoS flow for transmission. Therefore, it is necessary to optimize the process of the remote UE accessing the network.

Figure 4:
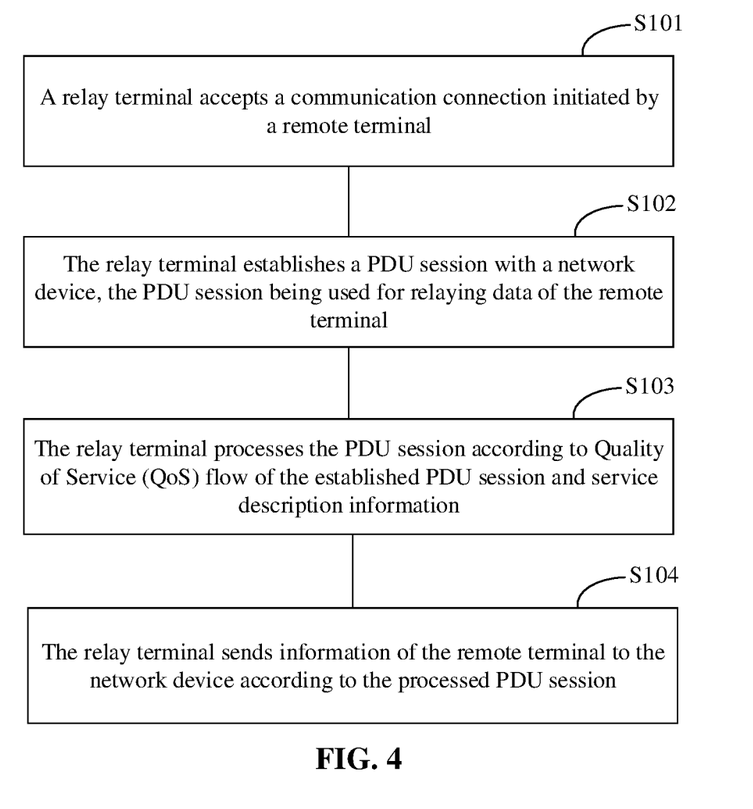
FIG. 4 is a flowchart of a method for establishing a connection on a relay terminal side according to an embodiment of the present disclosure.

Therefore, an embodiment of the present disclosure provides a method for establishing a connection. The method is applied to a terminal device, which is used as a relay terminal. Referring to FIG. 4, the method includes the following operations.

At S101, a relay terminal accepts a communication connection initiated by a remote terminal.

At S102, the relay terminal establishes a protocol data unit PDU session with a network device, the PDU session being used for relaying data of the remote terminal.

At S103, the relay terminal processes the PDU session based on service description information.

At S104, the relay terminal sends information of the remote terminal to the network device according to the PDU session as processed.

According to the embodiment of the present disclosure, a communication connection is established between the remote UE and the relay UE to trigger the relay UE to determine the PDU session used for relaying the data of the remote UE. After the PDU session is successfully established, the relay UE processes the PDU session based on the service description information and notifies a core network element that the PDU session is used for relaying the data of the remote UE. With the embodiment of the present disclosure, the relay UE may process the PDU session based on the service description information to achieve the purpose of optimizing the process of the remote UE accessing the network.

According to the embodiment of the present disclosure, optionally, the method for establishing a connection further includes that: the relay terminal receives first information from the remote terminal, the first information being used for the relay terminal to determine a QoS rule, and the relay terminal processing the PDU session according to the QoS rule.

It can be seen that the remote UE of the embodiment of the present disclosure may send the first information to the relay UE, and the first information is used to assist the relay UE to determine the QoS rule. Based on this QoS rule, the relay UE may process the PDU session to achieve the purpose of mapping the data of the remote UE to the correct QoS flow. That is to say, based on the first information sent by the remote UE, the relay UE can generate the corresponding QoS rule used for the PDU session between the relay UE and the network for the data from the remote UE, so that the relay UE can map the data of the remote UE to the correct QoS flow for transmission.

According to the embodiment of the present disclosure, optionally, the operation of processing, by the relay terminal, the PDU session based on service description information in S103 may be implemented in at least one of the following ways:

(1) The relay terminal modifies the PDU session to determine a QoS flow used for relaying data of a remote terminal corresponding to the service description information; or (2) When a QoS flow used for transmitting data corresponding to the service description information exists in the PDU session, the relay terminal determines to use the QoS flow to transmit the data corresponding to the service description information.

For the processing mode (1), the relay UE may determine, through the PDU session modification process, the QoS flow used for relaying the data of the remote UE, so that the relay UE may map the data of the remote UE to the correct QoS flow for transmission.

For the processing mode (2), in response to determining that the QoS flow required for relaying the data of the remote UE has already been existing in the PDU session, then the relay UE determines to use the QoS flow to relay the data of the remote UE, and may map the data of the remote UE to the correct QoS flow for transmission.

Correspondingly, an embodiment of the present disclosure also provides a method for establishing a connection.

The method is applied to a terminal device, which is used as a remote terminal. The method includes the following operation.

Figure 5:
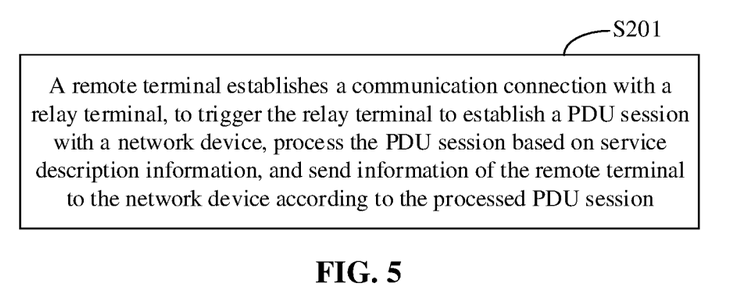
FIG. 5 is a flowchart of a method for establishing a connection on a remote terminal side according to an embodiment of the present disclosure.

At S201, a remote terminal establishes a communication connection with a relay terminal, to trigger the relay terminal to establish a PDU session with a network device, process the PDU session based on service description information, and send information of the remote terminal to the network device according to the PDU session as processed. The remote terminal sends first information to the relay terminal, the first information being used by the relay terminal to determine a QoS rule used by the relay terminal to process the PDU session.

Optionally, the remote terminal sends the first information to the relay terminal, the first information being used by the relay terminal to determine a QoS rule used by the relay terminal to process the PDU session.

In an embodiment of the present disclosure, the first information may include the follows contents.

Optionally, the first information includes service description information.

Optionally, the first information further includes direct communication interface PC5 QoS flow information corresponding to the service description information.

Further, optionally, the packet filter includes at least one of the following: Internet Protocol (IP) quintuple information, IP triple information, filter information for a source media access control (MAC) address, filter information for a destination MAC address.

Optionally, the IP quintuple information includes a source address, a source port number, a destination address, a destination port number and a protocol type.

Optionally, the IP triple information includes a destination address, a destination port number, and a protocol type.

In an embodiment of the present disclosure, the remote UE may select different timings to send the first information to the relay UE, for example:

(1) during accepting, by the relay terminal, the communication connection initiated by the remote terminal, the remote terminal sends the first information to the relay terminal; or (2) the remote terminal sends a connection update request message to the relay terminal, the connection update request message including the first information.

With at least one of the above embodiments of the present disclosure, a communication connection is established between the remote UE and the relay UE, which may trigger the relay UE to establish the PDU session used for relaying the data of the remote UE. After the PDU session is successfully established, the relay UE may modify this PDU session through the PDU session modification process, thereby determining the QoS flow used for relaying the data of the remote UE, and then the relay UE notifies the core network element that the PDU session is used for relaying the data of the remote UE.

Therefore, with at least one of the above embodiments of the present disclosure, it can solve the current problem that since the remote UE cannot generate the corresponding QoS rule used for the PDU session between the relay UE and the network for the data from the remote UE, so the data of the remote UE cannot be mapped to the correct QoS flow for transmission.

The implementation of the method for establishing a connection of the embodiment of the present disclosure has been described above by means of embodiments, and the specific implementation of the embodiment of the present disclosure will be described below by means of multiple specific examples.

Example 1

Figure 6:
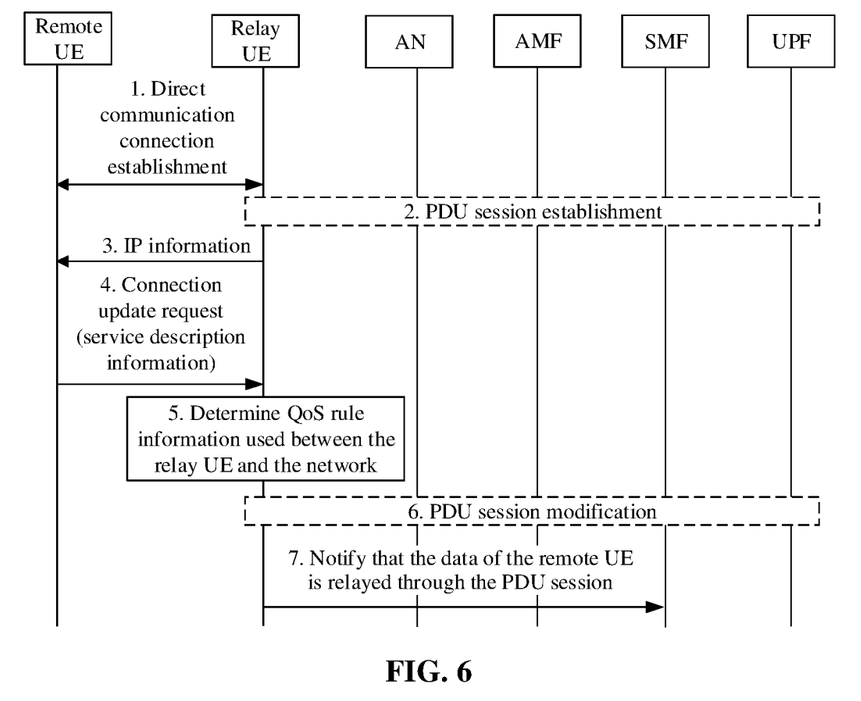
FIG. 6 is a flowchart of a remote terminal establishing a connection with a network according to an embodiment of the present disclosure.

FIG. 6 schematically illustrates a flowchart of a remote UE establishing a connection with a network according to an embodiment of the present disclosure. After establishing a PDU session, the relay UE obtains service description information through a PC5 connection update flow, determines a QoS rule, and modifies the PDU session. The specific process is described below.

1. A direct communication connection (such as a PC5 connection) is established between the remote UE and the relay UE.

2. The relay UE establishes a PDU session used for relaying data of the remote UE, such as a PDU session for accessing a specific slice or a specific data network. Optionally, operation 2 may be skipped if there is already a PDU session that meets the requirements.

3. For transmission such as of IP type, the relay UE sends assigned IP information, such as IP address information and/or IP address index, to the remote UE. For transmission such as of Ethernet type, there is no need to perform operation 3. Therefore, this operation 3 is optional, not required.

4. The remote UE sends a connection update request message to the relay UE. This connection update request message includes first service description information (e.g., a packet filter), which for IP type data may be, for example, IP quintuple information, that is, a source address, a source port number, a destination address, a destination port number and a protocol type; and which for Ethernet type data may be, for example, filter information including a source MAC address and a destination MAC address. Optionally, the connection update request message also includes PC5 interface QoS flow information corresponding to the first service description information, such as PFI (PC5 QoS flow identifier) and/or PQI (PC5 5QI, PC5 5G QoS identifier), etc.

5. The relay UE determines a QoS rule used for data transmission between the relay UE and the network based on the first service description information obtained from the remote UE (and optionally the PC5 interface QoS flow information corresponding to the first service description information). The QoS rule includes second service description information, which may be determined based on the first service description information obtained from the remote UE. For example, the same destination address, destination port number and protocol type as in the first service description information may be adopted, and the source address and the source port number in the first service description information are changed respectively into the address and port number used when the relay UE communicates with the network to forward and relay the data of the remote UE, as the second service description information. Once the QoS rule is determined, it can be used for PDU session modification.

6. PDU session modification process is triggered according to the QoS rule, to generate a new QoS flow or reuse an existing QoS flow; and data from the remote UE is mapped to corresponding QoS flow for transmission. Optionally, operation 6 may be skipped if the existing QoS rule is available.

7. The relay UE notifies (or reports) a core network element (such as SMF) that the PDU session is used for relaying the data of the remote UE.

Example 2

Figure 7:
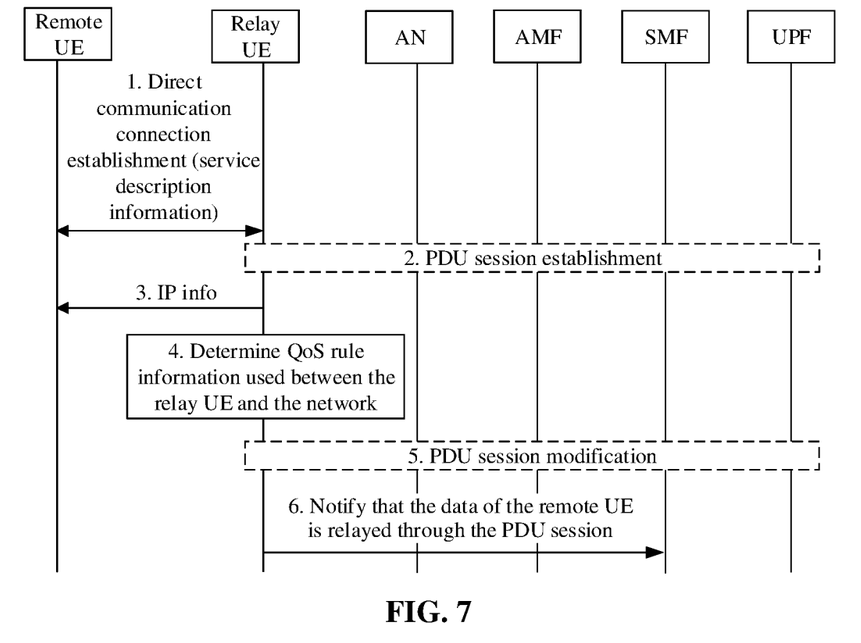
FIG. 7 is a flowchart of a remote terminal establishing a connection with a network according to another embodiment of the present disclosure.

FIG. 7 schematically illustrates a flowchart of a remote UE establishing a connection with a network according to another embodiment of the present disclosure. The main difference from Example 1 is that: in Example 2, the relay UE obtains the service description information during the PC5 connection establishment process, establishes the PDU session first, and then determines the QoS rule to modify the PDU session.

Specifically, in this Example 2, the remote UE may provide the service description information to the relay UE in operation 1. The service description information includes an IP triple, that is, a destination address, a destination port number and a protocol type, or the service description information may be filter information including a source MAC address and a destination MAC address.

It should be noted that although the remote UE in operation 1 of this Example 2 has not obtained the IP information assigned by the relay UE, it will not affect the implementation of the connection establishment process, and the relay UE in this Example 2 may still determine the required QoS rule information. Specifically, the service description information provided by the remote UE to the relay UE in operation 1 may only include, for example, an IP triple (a destination address, a destination port number and a protocol type). After operation 3, the relay UE may determine the QoS rule information according to the IP triple and the address and port number used when communicating with the network to forward and relay the data of the remote UE, and modify the PDU session based on the QoS rule information.

With at least one of the above embodiments of the present disclosure, the remote UE sends the service description information to the relay UE, so that the relay UE can generate the QoS rule used for the PDU session between the relay UE and the network for the data of the remote UE, so that the relay UE can map the data of the remote UE to the correct QoS flow to optimize the connection establishment mechanism of accessing the network through the relay UE.

Figure 8:
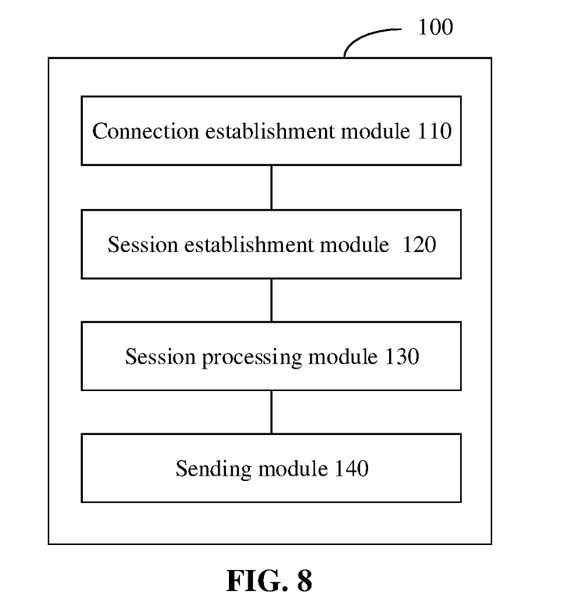
FIG. 8 is a schematic structural block diagram of a relay terminal device according to an embodiment of the present disclosure.

The specific arrangement and implementation of the embodiments of the present disclosure are described above from different perspectives through multiple embodiments. Corresponding to the processing method in at least one embodiment described above, an embodiment of the present disclosure also provides a terminal device 100, which is used as a relay terminal. Referring to FIG. 8, the terminal device 100 includes a connection establishment module 110, a session establishment module 120, a session processing module 130, and a sending module 140.

The connection establishment module 110 is configured to accept a communication connection initiated by a remote terminal.

The session establishment module 120 is configured to establish a PDU session with a network device, the PDU session being used for relaying data of the remote terminal.

The session processing module 130 is configured for the relay terminal to process the PDU session based on service description information.

The sending module 140 is configured to send information of the remote terminal to the network device according to the PDU session as processed.

Optionally, the terminal device 100 further includes: a receiving module, configured to receive first information from the remote terminal, the first information being used by the relay terminal to determine a QoS rule, and the session processing module processing the PDU session according to the QoS rule.

Optionally, the session processing module 130 includes: a session modification sub-module, configured to modify the PDU session to determine a QoS flow used for relaying data of a remote terminal corresponding to the service description information.

Optionally, the session processing module 130 includes: a determining sub-module, configured to, in response to determining that a QoS flow used for transmitting data corresponding to the service description information exists in the PDU session, determine to use the QoS flow to transmit the data corresponding to the service description information.

Optionally, in the process of the connection establishment module 110 accepting the communication connection initiated by the remote terminal, the receiving module receives the first information sent by the remote terminal.

Optionally, the receiving module receives a connection update request message sent by the remote terminal, the connection update request message including the first information.

Optionally, the connection establishment module 110 accepts a direct communication connection initiated by the remote terminal.

Figure 9:
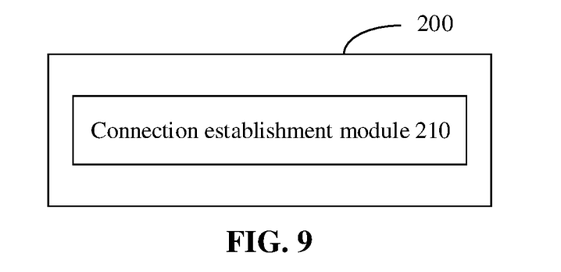
FIG. 9 is a schematic structural block diagram of a remote terminal device according to an embodiment of the present disclosure.

Corresponding to the processing method of at least one embodiment described above, an embodiment of the present disclosure also provides a terminal device 200, which is used as a remote terminal. Referring to FIG. 9, the terminal device 200 includes a connection establishment module 210.

The connection establishment module 210 is configured to establish a communication connection with a relay terminal to trigger the relay terminal to establish a PDU session with a network device, process the PDU session based on service description information, and send information of a remote terminal to the network device according to the PDU session as processed.

Optionally, the terminal device 200 further includes: a sending module, configured to send first information to the relay terminal, the first information being used by the relay terminal to determine a QoS rule used for the relay terminal to process the PDU session.

Optionally, in the process of the connection establishment module 210 establishing the communication connection with the relay terminal, the sending module sends the first information to the relay terminal.

Optionally, the sending module is configured to send a connection update request message to the relay terminal, the connection update request message including the first information.

Optionally, the connection establishment module 210 establishes a direct communication connection with the relay terminal.

Optionally, the first information includes service description information.

Optionally, the first information further includes PC5 QoS flow information corresponding to the service description information.

Optionally, the service description information includes a packet filter.

Optionally, the packet filter includes at least one of the following: IP quintuple information, IP triple information, filter information for a source MAC address, filter information for a destination MAC address.

Optionally, the IP quintuple information includes a source address, a source port number, a destination address, a destination port number and a protocol type; and the IP triple information includes a destination address, a destination port number and a protocol type.

The terminal device 100 and the terminal device 200 in the embodiments of the present disclosure can implement the corresponding functions of the devices in the aforementioned method embodiments. The corresponding flow, function, implementation and beneficial effects of each module (sub-module, unit or component, etc.) in the terminal device 100 and the terminal device 200 may be referred to the corresponding description in the aforementioned method embodiments, which will not be repeated here.

It should be noted that the functions described for each module (sub-module, unit or component, etc.) in the terminal device 100 and the terminal device 200 in the embodiments of the present disclosure may be implemented by different modules (sub-module, unit or component, etc.) or may be implemented by the same module (sub-module, unit or component, etc.). For example, a first sending module and a second sending module may be different modules or the same module, all of which can implement corresponding functions in the embodiments of the present disclosure. In addition, the sending module and the receiving module in the embodiments of the present disclosure may be implemented by a transceiver of the device, and some or all of the remaining modules may be implemented by the processor of the device.

Figure 10:
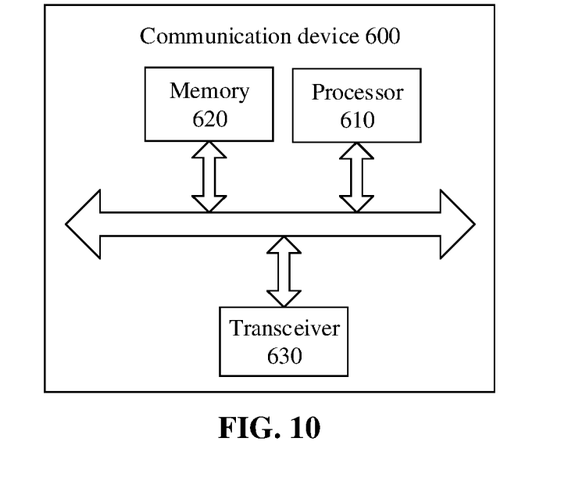
FIG. 10 is a schematic block diagram of a communication device according to an embodiment of the present disclosure.

FIG. 10 is a schematic structural diagram of a communication device 600 according to an embodiment of the present disclosure. The communication device 600 includes a processor 610 that may invoke and run a computer program from a memory to implement the method in the embodiments of the present disclosure.

Optionally, the communication device 600 may also include a memory 620. The processor 610 may invoke and run the computer program from the memory 620 to implement the method in the embodiments of the present disclosure.

The memory 620 may be a separate device independent of the processor 610 or may be integrated in the processor 610.

Optionally, the communication device 600 may also include a transceiver 630. The processor 610 may control the transceiver to communicate with other devices, and in particular to send information or data to or receive information or data sent by other devices.

The transceiver 630 may include a transmitter and a receiver. The transceiver 630 may further include antennas, the number of which may be one or more.

Optionally, the communication device 600 may be a network device in the embodiment of the present disclosure, and the communication device 600 may implement corresponding processes implemented by the network device in the respective methods of the embodiments of the present disclosure, which will not be repeated here for the sake of brevity.

Optionally, the communication device 600 may be a terminal device in the embodiment of the present disclosure, and the communication device 600 may implement corresponding processes implemented by the terminal device in the respective methods of the embodiments of the present disclosure, which will not be repeated here for the sake of brevity.

Figure 11:
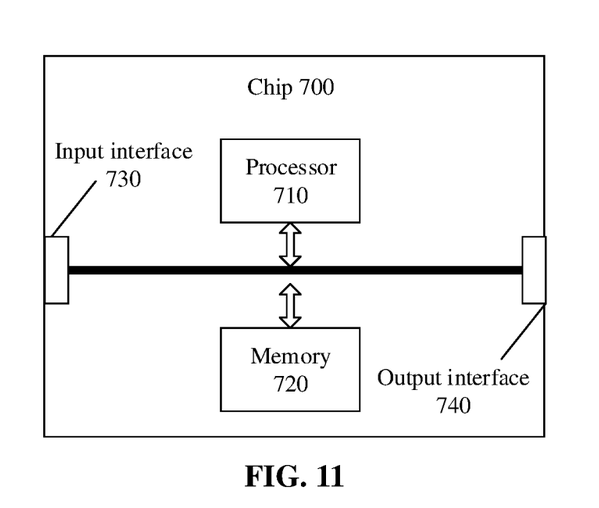
FIG. 11 is a schematic block diagram of a chip according to an embodiment of the present disclosure.

FIG. 11 is a schematic structural diagram of a chip 700 according to an embodiment of the present disclosure. The chip 700 includes a processor 710 that may invoke and run a computer program from a memory to implement the method in the embodiments of the present disclosure. The processor 710 may include at least one processor circuit.

Optionally, the chip 700 may also include a memory 720. The processor 710 may invoke and run the computer program from the memory 720 to implement the method in the embodiments of the present disclosure.

The memory 720 may be a separate device independent of the processor 710 or may be integrated in the processor 710.

Optionally, the chip 700 may also include an input interface 730. The processor 710 may control the input interface 730 to communicate with other devices or chips, and in particular to obtain information or data sent by other devices or chips.

Optionally, the chip 700 may also include an output interface 740. The processor 710 may control the output interface 740 to communicate with other devices or chips, and in particular to output information or data to other devices or chips.

Optionally, the chip may be applied to the network device in the embodiment of the present disclosure, and the chip may implement corresponding processes implemented by the network device in the respective methods of the embodiments of the present disclosure, which will not be repeated here for the sake of brevity.

Optionally, the chip may be applied to the terminal device in the embodiment of the present disclosure, and the chip may implement corresponding processes implemented by the terminal device in the respective methods of the embodiments of the present disclosure, which will not be repeated here for the sake of brevity.

It should be understood that the chip involved in embodiments of the present disclosure may also be referred to as a system level chip, a system chip, a chip system, or a system-on-chip or the like.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM).

It should be understood that the memory described above is exemplary, but not limiting. For example, the memory in embodiments of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and Direct Rambus RAM (DR RAM), etc. That is to say, the memory in the embodiments of the present disclosure is intended to include but not limited to these and any other suitable types of memory.

Figure 12:
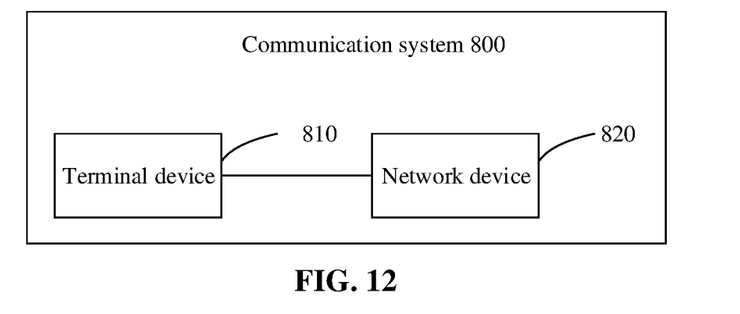
FIG. 12 is a schematic block diagram of a communication device according to an embodiment of the present disclosure.

FIG. 12 is a schematic block diagram of a communication device 800 according to an embodiment of the present disclosure. The communication system 800 includes a terminal device 810 and a network device 820.

The terminal device 810 may be configured to implement corresponding functions implemented by the terminal device in the methods of various embodiments of the present disclosure, and the network device 820 may be used to implement corresponding functions implemented by the network device in the methods of various embodiments of the present disclosure. It will not be repeated here for the sake of brevity.

In the above-described embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed by a computer, the flow or function described in accordance with the embodiments of the present disclosure is generated in whole or in part. The computer may be a general purpose computer, a dedicated computer, a computer network, or other programmable devices. The computer instructions may be stored in a computer-readable storage medium, or transmitted from one computer-readable storage medium to another computer-readable storage medium. For example, the computer instructions may be transmitted from one Web site, computer, server, or data center to another Web site, computer, server, or data center through a wired (e.g. coaxial cable, optical fiber, Digital Subscriber Line (DSL)) or wireless (e.g. infrared, wireless, microwave, etc.) mode. The computer-readable storage medium may be any available medium accessible by a computer or a data storage device such as a server or a data center integrated with one or more available media. The available media may be a magnetic media (e.g., a floppy disk, a hard disk, a magnetic tape), an optical media (e.g., DVD), or a semiconductor media (e.g. Solid State Disk (SSD)), etc.

It should be understood that in various embodiments of the present disclosure, the sequence number size of the above-mentioned processes does not mean the order of execution, and the execution order of each process should be determined by its function and inherent logic, and should not be limited in any way to the implementation process of the embodiments of the present disclosure. Those skilled in the art will clearly appreciate that, for convenience and conciseness of description, the specific operating processes of the above-described systems, apparatuses and units can refer to the corresponding processes in the aforementioned method embodiments and will not be repeated herein. The above description is only the specific implementation of the present disclosure, but the scope of protection of the present disclosure is not limited thereto. Any changes or substitutions within the technical scope disclosed in the present disclosure that can be easily thought of by those familiar with the technical field should be covered within the scope of protection of the present disclosure. Therefore, the scope of protection of the present disclosure shall be subject to the scope of protection of the claims.

What is claimed is:

1. A method for establishing a connection, comprising:
   establishing, by a relay terminal, a protocol data unit (PDU) session with a network device, wherein the PDU session is used for relaying data of a remote terminal which has established a communication connection with the relay terminal;
   processing, by the relay terminal, the PDU session based on service description information; and
   sending, by the relay terminal, information of the remote terminal to the network device according to the PDU session as processed,
   wherein the method further comprises:
   receiving, by the relay terminal, first information from the remote terminal, wherein the first information is used by the relay terminal to determine a Quality of Service (QoS) rule; and
   processing, by the relay terminal, the PDU session according to the QoS rule;
   wherein the first information comprises the service description information and communication interface PC5 QoS flow information corresponding to the service description information.

2. The method of claim 1, wherein the processing, by the relay terminal, the PDU session based on the service description information comprises:
   modifying, by the relay terminal, the PDU session to determine a QoS flow used for relaying the data of the remote terminal corresponding to the service description information.

3. The method of claim 1, wherein the processing, by the relay terminal, the PDU session based on the service description information comprises:
   in response to determining that a QoS flow used for transmitting data corresponding to the service description information exists in the PDU session, determining, by the relay terminal, to transmit the data corresponding to the service description information using the QoS flow.

4. The method of claim 1, wherein the service description information comprises a packet filter.

5. The method of claim 1, further comprising:
   receiving, by the relay terminal, a connection update request message from the remote terminal, wherein the connection update request message comprises first information.

6. A terminal device, comprising:
   a processor; and
   a memory for storing a computer program executable by the processor,
   wherein the processor is configured to execute the computer program to:
   establish a protocol data unit (PDU) session with a network device, wherein the PDU session is used for relaying data of a remote terminal which has established a communication connection with the terminal device;
   process the PDU session based on service description information; and
   send information of the remote terminal to the network device according to the PDU session as processed,
   wherein the processor is further configured to:
   receive first information from the remote terminal, wherein the first information is used by the terminal device to determine a Quality of Service (QoS) rule; and
   process the PDU session according to the QoS rule;
   wherein the first information comprises the service description information and communication interface PC5 QoS flow information corresponding to the service description information.

7. The terminal device of claim 6, wherein the processor is further configured to:
   modify the PDU session to determine a QoS flow used for relaying data of the remote terminal corresponding to the service description information.

8. The terminal device of claim 6, wherein the processor is further configured to:
   in response to determining that a QoS flow used for transmitting data corresponding to the service description information exists in the PDU session, determine to use the QoS flow to transmit the data corresponding to the service description information.

9. The terminal device of claim 6, wherein the service description information comprises a packet filter.

10. A terminal device, comprising:
a processor; and
a memory for storing a computer program executable by the processor,
wherein the processor is configured to execute the computer program to establish a communication connection with a relay terminal to trigger the relay terminal to establish a protocol data unit (PDU) session with a network device, process the PDU session based on service description information, and send information of the terminal device to the network device according to the PDU session as processed,
wherein the processor is further configured to:
send first information to the relay terminal, wherein the first information is used by the relay terminal to determine a Quality of Service (QoS) rule used for the relay terminal to process the PDU session; and
process the PDU session according to the QoS rule;
wherein the first information comprises the service description information and communication interface PC5 QoS flow information corresponding to the service description information.

11. The terminal device of claim 10, wherein the service description information comprises a packet filter.

* * * * *